US005940051A

United States Patent [19]
Sala et al.

[11] Patent Number: 5,940,051
[45] Date of Patent: Aug. 17, 1999

[54] DISPLAY SYSTEM

[75] Inventors: Oscar Gotlieb Sala, Dianella; Mickey Andrew Sala, Duncraig, both of Australia

[73] Assignee: Dr. Sala & Associates PTY Ltd., Perth, Western Australia, Australia

[21] Appl. No.: 08/793,431

[22] PCT Filed: Aug. 11, 1995

[86] PCT No.: PCT/AU95/00491

§ 371 Date: Feb. 11, 1997

§ 102(e) Date: Feb. 11, 1997

[87] PCT Pub. No.: WO96/05587

PCT Pub. Date: Feb. 22, 1996

[30] Foreign Application Priority Data

Aug. 11, 1994 [AU] Australia ................................ PM7388

[51] Int. Cl.[6] ...................................................... G06K 15/20

[52] U.S. Cl. .............................. 345/55; 345/56; 345/121; 345/473; 345/474

[58] Field of Search .................................. 345/31, 40, 42, 345/48, 51, 55, 56, 59, 112, 121, 202, 123, 473, 474, 475

[56] References Cited

U.S. PATENT DOCUMENTS

| | | | |
|---|---|---|---|
| 2,479,880 | 8/1949 | Toulon . | |
| 3,136,847 | 6/1964 | Brown . | |
| 3,566,023 | 2/1971 | Smierciak . | |
| 3,586,775 | 6/1971 | Smierciak . | |
| 3,868,675 | 2/1975 | Firmin | 345/56 |
| 3,988,728 | 10/1976 | Inoue et al. | 345/121 |
| 4,068,265 | 1/1978 | Russel . | |
| 4,386,351 | 5/1983 | Lowdenslager | 345/56 |
| 5,027,112 | 6/1991 | Ross et al. | 345/56 |
| 5,258,754 | 11/1993 | Broderick et al. | 345/51 |
| 5,406,300 | 4/1995 | Tokimoto et al. | 345/31 |
| 5,748,157 | 5/1998 | Eason | 345/31 |

FOREIGN PATENT DOCUMENTS

| | | |
|---|---|---|
| 0146713 | 7/1985 | European Pat. Off. . |
| 0174056 | 3/1986 | European Pat. Off. . |
| 1232108 | 5/1971 | United Kingdom . |
| 1236749 | 6/1971 | United Kingdom . |
| 1250226 | 10/1971 | United Kingdom . |

*Primary Examiner*—Jeffery Brier
*Assistant Examiner*—Vincent E. Kovalick
*Attorney, Agent, or Firm*—Larson & Taylor

[57] ABSTRACT

An improved display system which is able to display both static and moving graphics on a reduced number of pixels. The display system relies upon the beta apparent movement effect to "fill in" the blank spaces between active pixels to give the appearance of supporting an image which does not in fact exist. The display system can display moving graphics at high resolution and static graphics at low resolution.

14 Claims, 12 Drawing Sheets

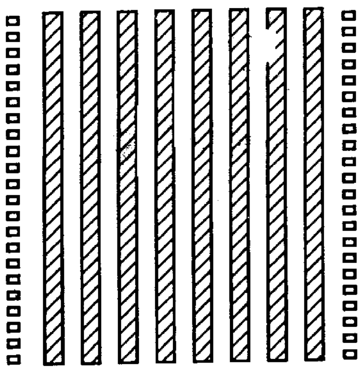
FIG. 1.1.1
PRIOR ART
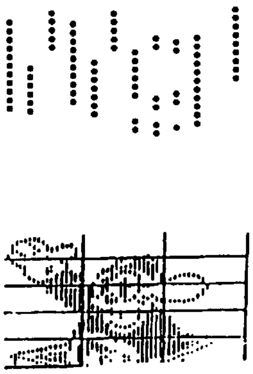
FIG. 1.1.2
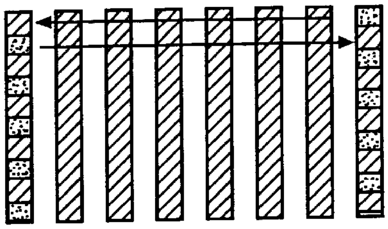
FIG. 1.2.1
PRIOR ART
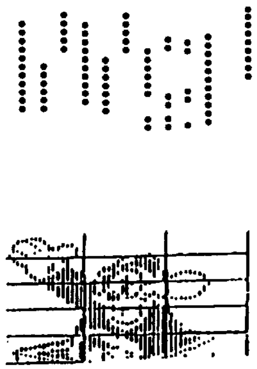
FIG. 1.2.2
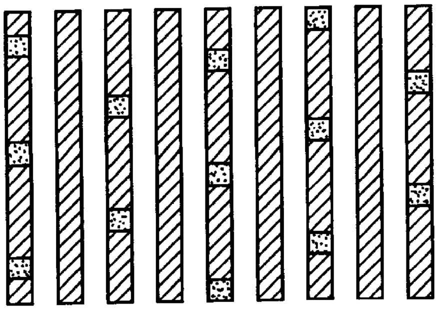
FIG. 1.3.1
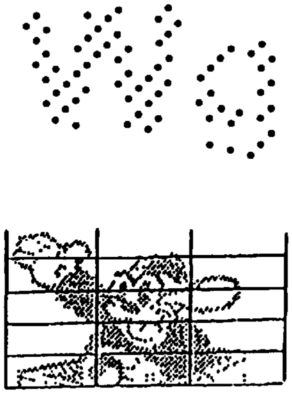
FIG. 1.3.2

FIG. 1.1.3
FIG. 1.1.4
FIG. 1.2.3
FIG. 1.2.4
FIG. 1.3.3
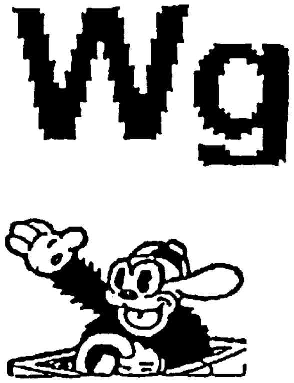
FIG. 1.3.4

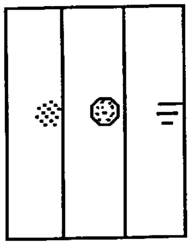
FIG. 2.1
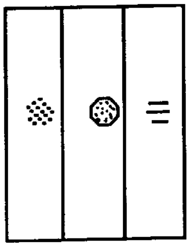
FIG. 2.2
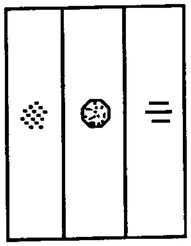
FIG. 2.3
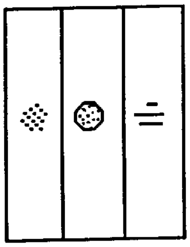
FIG. 2.4
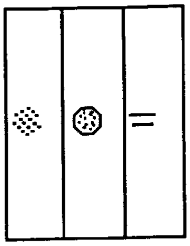
FIG. 2.5
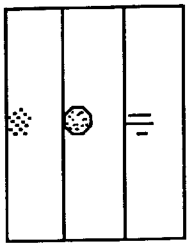
FIG. 2.6
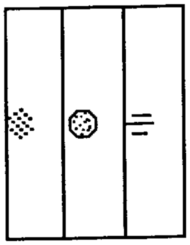
FIG. 2.7
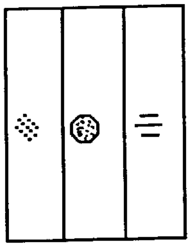
FIG. 2.8
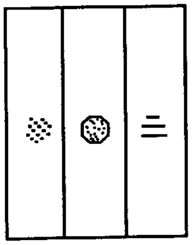
FIG. 2.9
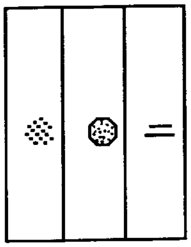
FIG. 2.10
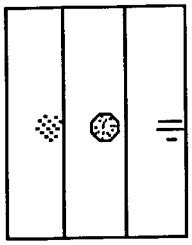
FIG. 2.11
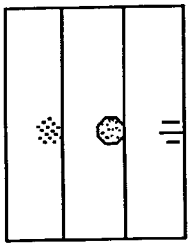
FIG. 2.12

DISPLAY SYSTEM

FIELD OF THE INVENTION

The present invention relates to a improved display system particularly, although not exclusively, envisaged for use as a sign for displaying moving and static graphics.

In the context of the present invention the term "graphic" includes sequences of any length made up of letters, words, numbers and idiographs. The term "graphic" also includes any combination of the above sequences, wether in monochrome or in colour.

Also, in the context of the present invention the term "pixel" is used as an abbreviation of the term "picture element". Then a group of pixels spread out over an area are referred to as a "picture cell". In the drawings the pixels are referred to as "lights" and the picture cells are referred to as "tiles". A plurality of the picture cells arranged together are herein referred to as a "display board". The display board can be in the form of a single row, a single column or a matrix of rows and columns.

BACKGROUND OF THE INVENTION

In Australian Patents 493,435 and 573,024 there are shown two previous forms of display systems which are of a similar type as the present invention. In these two patents (and the present invention) the displays rely on a process known in psycho-physics as "the beta effect". Basically, the beta effect is that the human visual system (which is a combination of the eyes and the brain) relies upon integrals of light images over time rather than instantaneous light images and hence the human visual system has the capacity to "fill in" missing information. Hence, the human visual system can resolve a given resolution in an image which has a large part of the image missing (such as up to about 90% of the image missing)—provided the image is moving.

In Patents 493,435 and 573,024 this effect was used to reduce the number of pixels required to provide a given resolution of moving image. However, both of these prior art displays rely upon columns which are spaced relatively far apart. A result of this is that at slower rates of data transmission across the display the viewer becomes aware that there are vertical black bands in the resultant image. This also manifests as flicker.

We have found that these problems can be overcome by taking the pixels in the columns and distributing the pixels over the area which in the Patents 493,435 and 573,024 were blank.

A comparison of these 3 systems is shown in FIGS. 1.1.1 to 1.3.4. These Figures show that a static graphic in the systems of Patents 493,435 and 573,024 is virtually unrecognisable and a moving graphic in the same systems experiences flicker. Whereas the same graphics, on the system of the present invention, are recognisable (for static graphics) and free of flicker (for moving graphics). Each system has the same number of pixels, but in the present invention the pixels are distributed over the area between the adjacent columns of the previous systems (that is, distributed over the picture cell). Also, the two previous systems are not able to show a graphic moving in a vertical direction.

In FIGS. 2.1 to 2.12 there is shown a comparison of the display system of the present invention (upper third of each Figure) with those of a full matrix display system (middle third of each Figure) and either of the systems of Patents 493,435 and 573,024 (lower third of each Figure). It can be seen that the full matrix display and the display system of the present invention both show a ball rising and falling. If the 12 Figures could be overlayed it would also be seen that the display system of the present invention shows the motion of the ball at substantially the same resolution as that of the full matrix display. In contrast the display systems of 493,435 and 573,024 show only 2 or 3 line segments rising and falling over the display.

Hence, the display system of the present invention has the same number of pixels as the systems of 493,435 and 573,024 but distributed across the picture cell to provide a display which has better resolution and is able to show graphics with vertical, as well as horizontal, components of movement and is able to show both moving and static graphics in a way that the entire graphic can be interpreted by a viewer of the display.

SUMMARY OF THE INVENTION

Therefore, it is an object of the present invention to provide a improved display system which has substantially the same number of pixels (as the display systems of Australian Patents 493,435 and 573,024) distributed substantially uniformly over its viewing area so as to allow interpretation by a person viewing the display of both moving graphics and static graphics.

In accordance with one aspect of the present invention there is provided a improved display system for depicting a moving graphic at high resolution and a static graphic at low resolution, the display system showing portions of the graphic distributed over it and the distribution being such that the graphic is interpretable as the complete graphic, the display system comprising:

a display means having at least one picture cell, the at least one picture cell having a plurality of pixels including active pixels which can be illuminated and inactive pixels which can not be illuminated, the inactive pixels being located between the active pixels such that the active pixels are substantially uniformly distributed over the picture cell for showing the graphic at a uniform intensity for both moving graphics and static graphics and so that the display means can be viewed at much closer distances than would otherwise be possible, the active pixels being able to be illuminated so as to depict the portions of the graphic distributed over the picture cell; and, a controller means for generating a first set of electrical signals representing each successive portion of the graphic for displaying successive portions of the graphic distributed over the entire picture cell at each instant in time, and for generating a second set of electrical signals for causing the portions of the graphic to be displayed upon the picture cell, the first set of electrical signals being able to cause the active pixels to be illuminated in correspondence with the portions of the graphic and the second set of electrical signals being able to cause the successive portions of the graphic to be displayed upon the picture cell such that by the visual accumulation of successive ones of the second set of electrical signals a person viewing the picture cell the entire graphic is displayed over the active pixels over a period of time, and such that the display means can display moving graphics at high resolution and static graphics at low resolution whilst being interpretable as the entire graphic.

In accordance with another aspect of the present invention there is provided a method of depicting a moving graphic at high resolution and a static graphic at low resolution on a display means having at least one picture cell, the at least one picture cell having a plurality of pixels including active pixels which can be illuminated and inactive pixels which can not be illuminated, the inactive pixels being located between the active pixels such that the active pixels are substantially uniformly distributed over the picture cell for showing the graphic at a uniform intensity for both moving graphics and static graphics and so that the display means can be viewed at much closer distances than would otherwise be possible, the active pixels being able to be illuminated so as to depict the graphic, and a controller means for generating a first set of electrical signals representing each successive portion of the graphic for displaying successive portion of the graphic distributed over the entire picture cell at each instant in time, and for generating a second set of electrical signals for causing the portions of the graphic to be displayed upon the picture cell, the first set of electrical signals being able to cause the active pixels to be illuminated in correspondence with the portions of the graphic and the second set of electrical signals being able to cause the successive portions of the graphic to be displayed upon the picture cell such that by the visual accumulation of successive ones of the second set of electrical signals by a person viewing the picture cell the entire graphic is displayed over the active pixels over a period of time, the method comprising the steps of generating the first set of electrical signals corresponding to the entire graphic, generating the second set of electrical signals and applying the second set of electrical signals to the display means for causing successive portions of the graphic to be displayed upon the at least one picture cell so that the display means can display moving graphics at high resolution and static graphics at low resolution whilst being interpretable as the entire graphic.

BRIEF DESCRIPTION OF THE DRAWINGS

An exemplary embodiment of the present invention will now be described with reference to the accompanying drawings in which:

FIGS. 1.1.1 to 1.3.4 are graphical views showing a comparison of an improved display system in accordance with the present invention with the display systems of Australian Patents Nos. 493,435 and 573,024;

FIGS. 2.1 to 2.12 are graphical views showing a comparison of the three systems of FIGS. 1.1.1 to 1.3.4 in relation to a ball bouncing vertically;

DETAILED DESCRIPTION OF THE PREFERRED EMBODIMENT(S)

Figure 3:
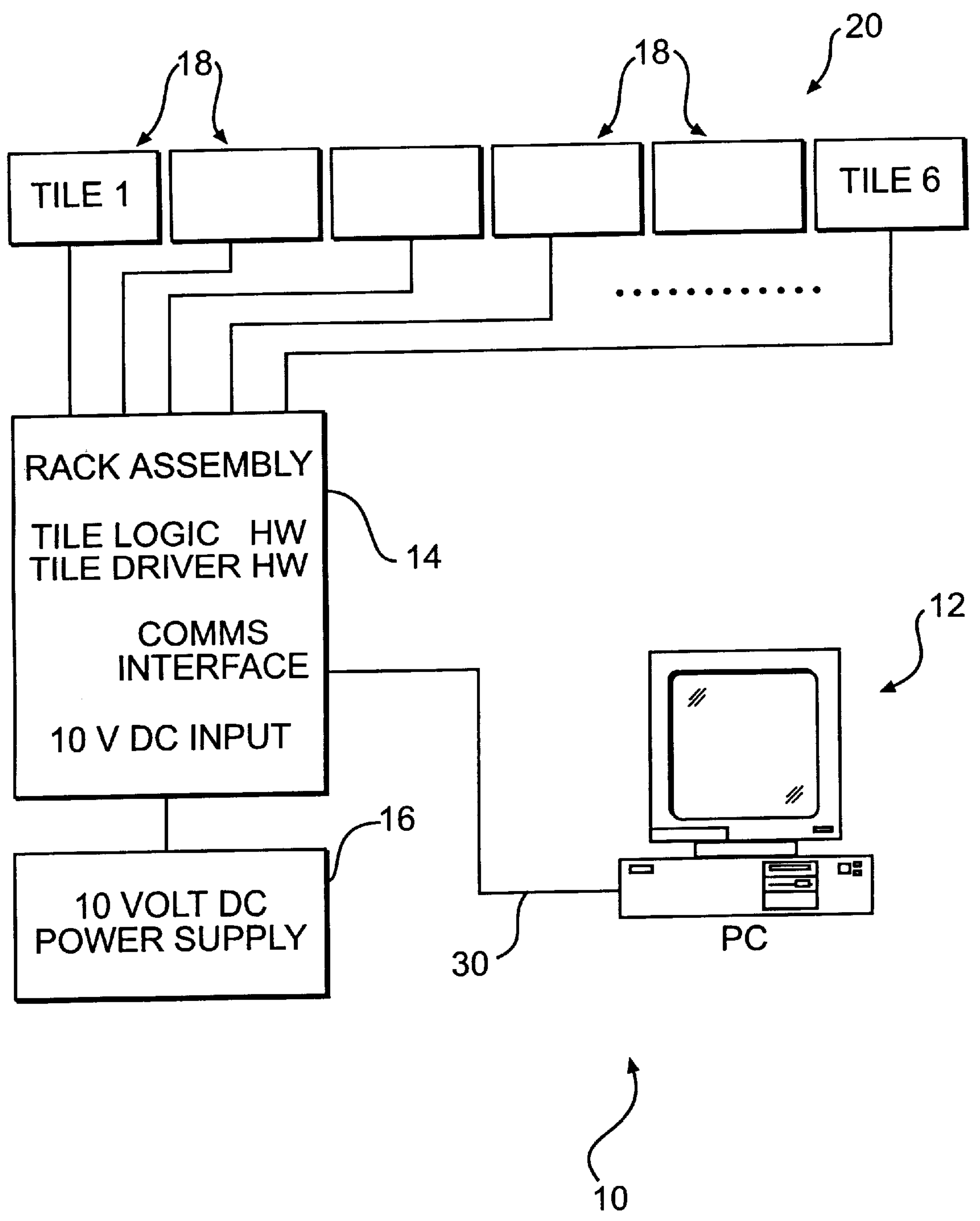
FIG. 3 is a schematic circuit diagram of a display system in accordance with the present invention incorporating 6 picture cells arranged horizontally in a single row.

In FIG. 3 there is shown a display system 10 in accordance with the present invention. The display system 10 comprises a controller, conveniently in the form of a computer 12, a rack assembly 14, a power supply 16 and a plurality of picture cells 18, such as 6 picture cells 18 arranged in a row to form a display board 20.

The computer 12 is typically in the form of a personal type computer programmed with the visual details of a graphic to be displayed on the display board 20. The computer 12 is typically connected to the rack assembly 14 via a communications output 30 (hereinafter referred to as a comms output 30) of the computer 12.

The rack assembly 14 has a communications interface 40 (hereinafter referred to as a comms interface 40) which is connected to the comms output 30 of the computer 12. The comms interface 40 is configured to receive signals from the computer 12 and convert them into signals capable of being used by the rack assembly 14. This allows the computer 14 to be located at a large distance from the rack assembly 14 and the display board 20.

Figure 6A:
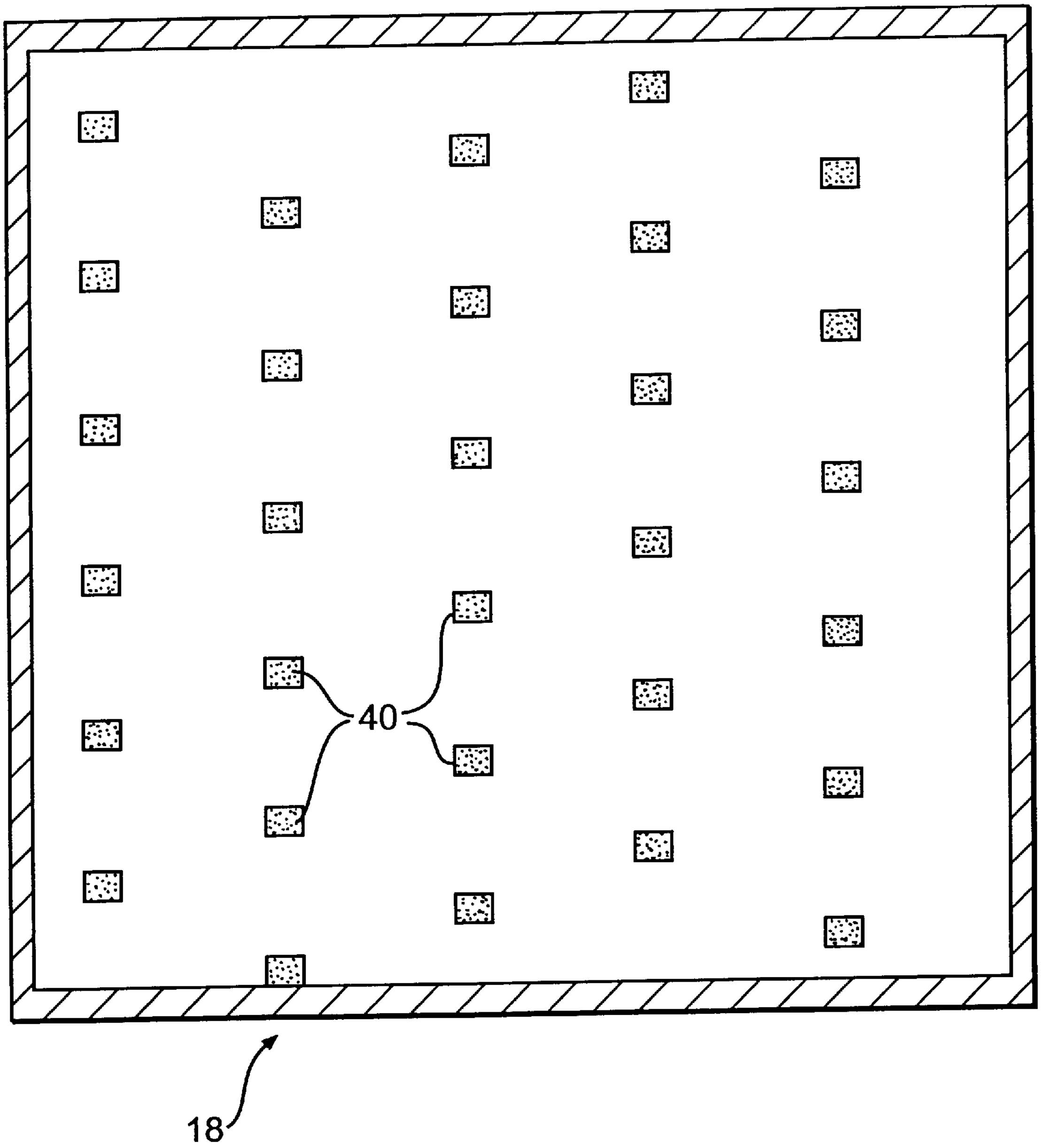
FIG. 6A is a plan view of a picture cell of the display system of the present invention incorporating 30 pixels.
Figure 6B:
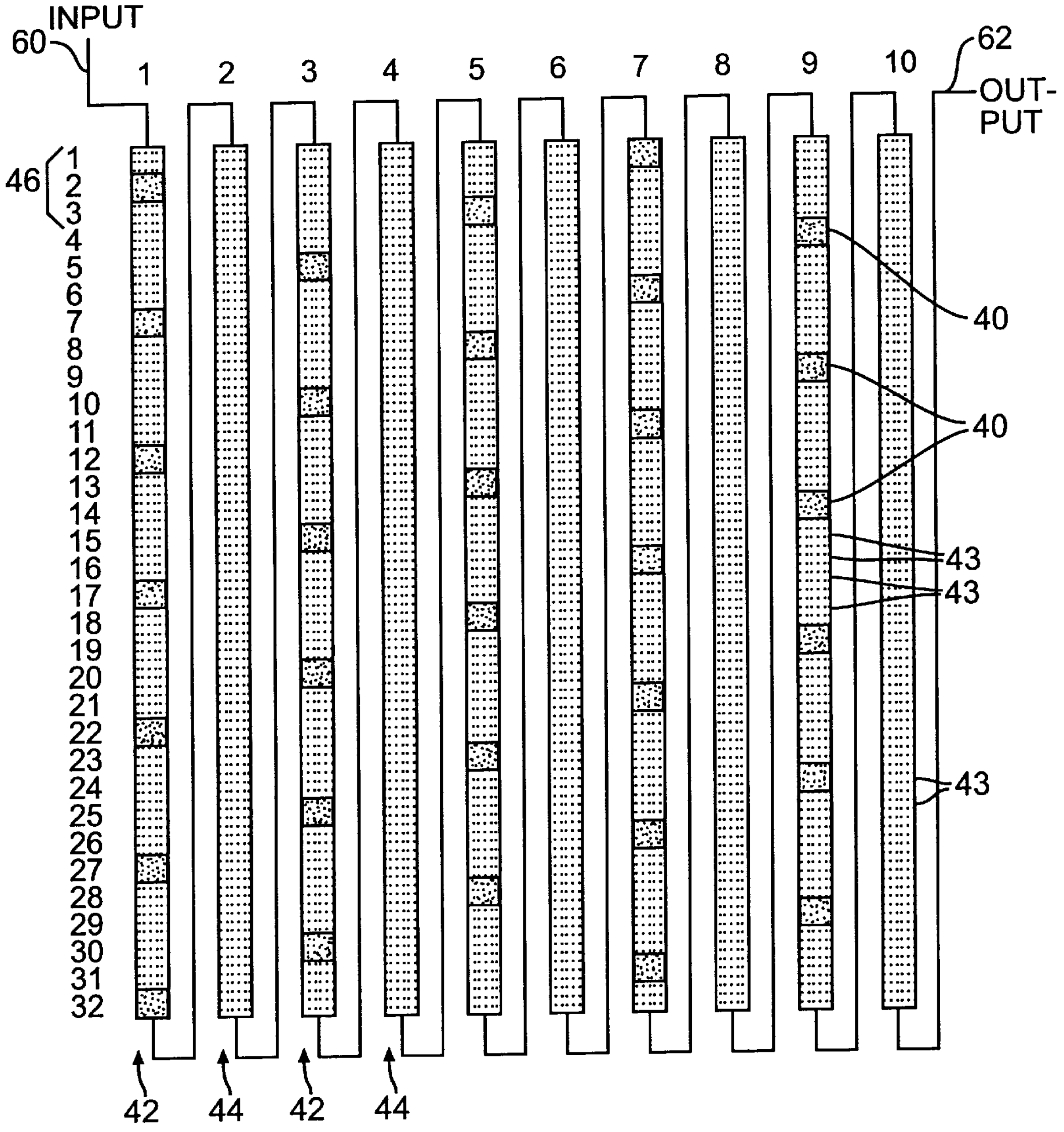
FIG. 6B is a graphical view of the layout of pixels in a picture cell incorporating 32 pixels and showing the order of operation of the pixels.

As can be seen in FIGS. 6A and 6B each of the picture cells 18 has a plurality of pixels 40, represented by black squares. The gaps between the pixels 40 are indicated by lightly shaded areas. The pixels 40 are arranged in a regular pattern over the picture cell 18. The regular pattern, in the present embodiment, has 5 columns 42 with 32 active pixels 40 and 288 inactive pixels 43 (there being 4 inactive pixels 43 between each active pixel 40 in the columns 42), a space columns 44 (having 32 inactive pixels 43) interleaving the columns 42 and 32 rows 46, with one pixel 40 in each row 46. That is, there are no two pixels 40 in the same row 46 in an individual one of the picture cells 18. This is desired so as to achieve a uniform intensity across the picture cell 18 when in operation. In FIG. 6B the columns 42 are numbered 1, 3, 5, 7 and 9, the space columns 44 are numbered 2, 4, 6, 8 and 10 and the rows are numbered 1 to 32.

Figure 5A:
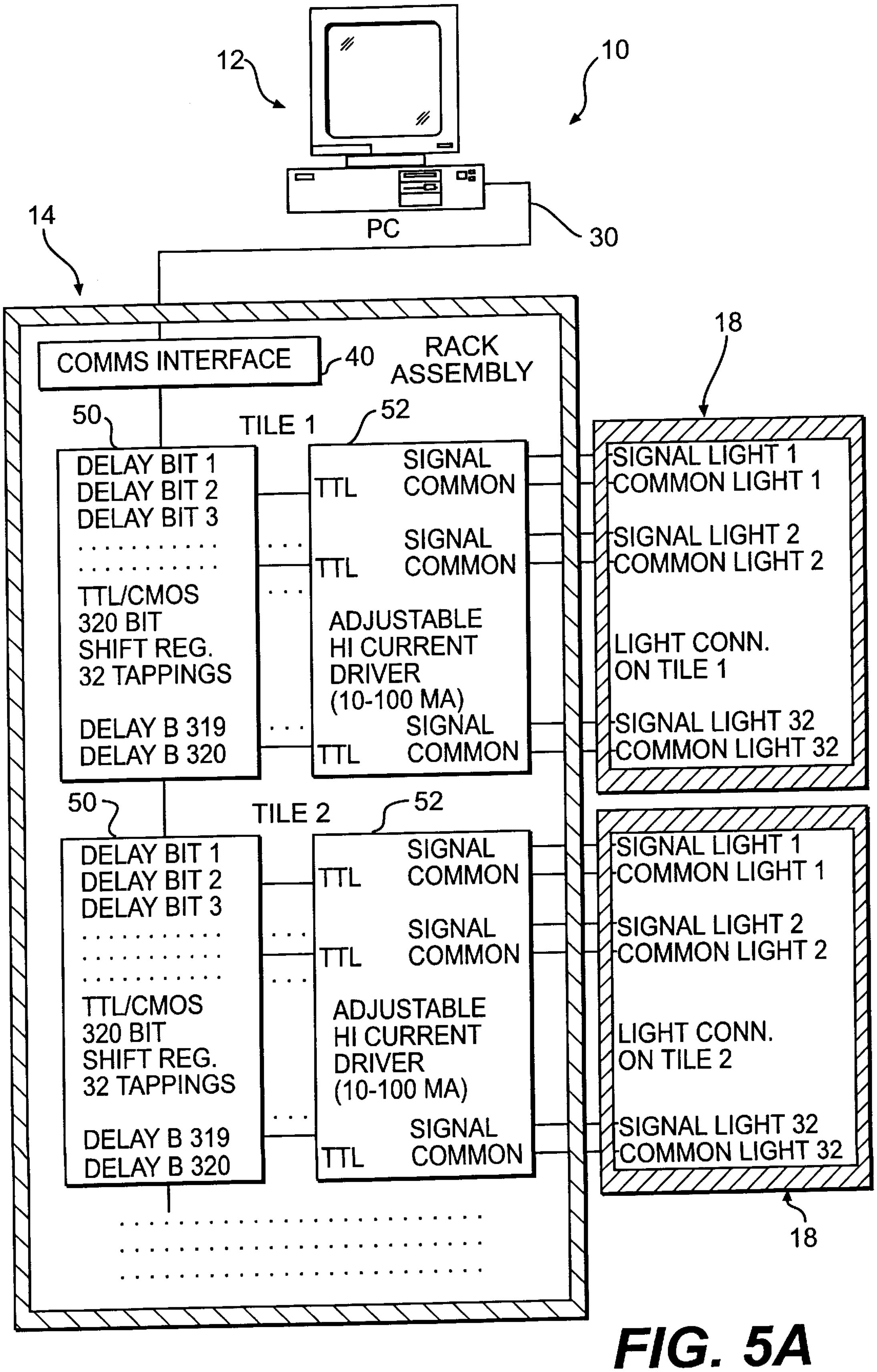
FIGS. 5A and 5B are schematic circuit diagrams of the display system of the present invention showing a rack assembly for a single row of picture cells similar to that of the display system of FIG. 3.
Figure 5B:
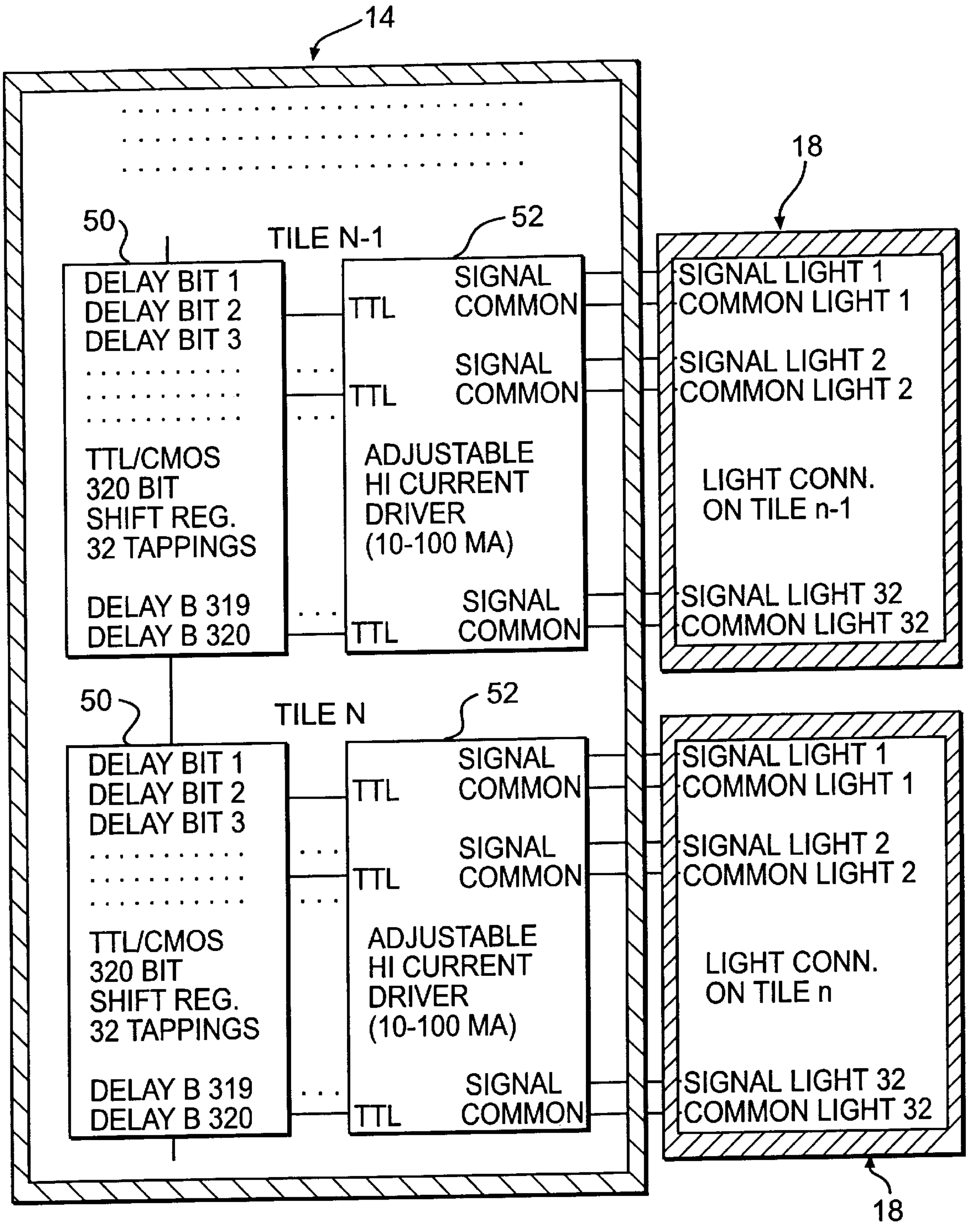
Figure 5C:
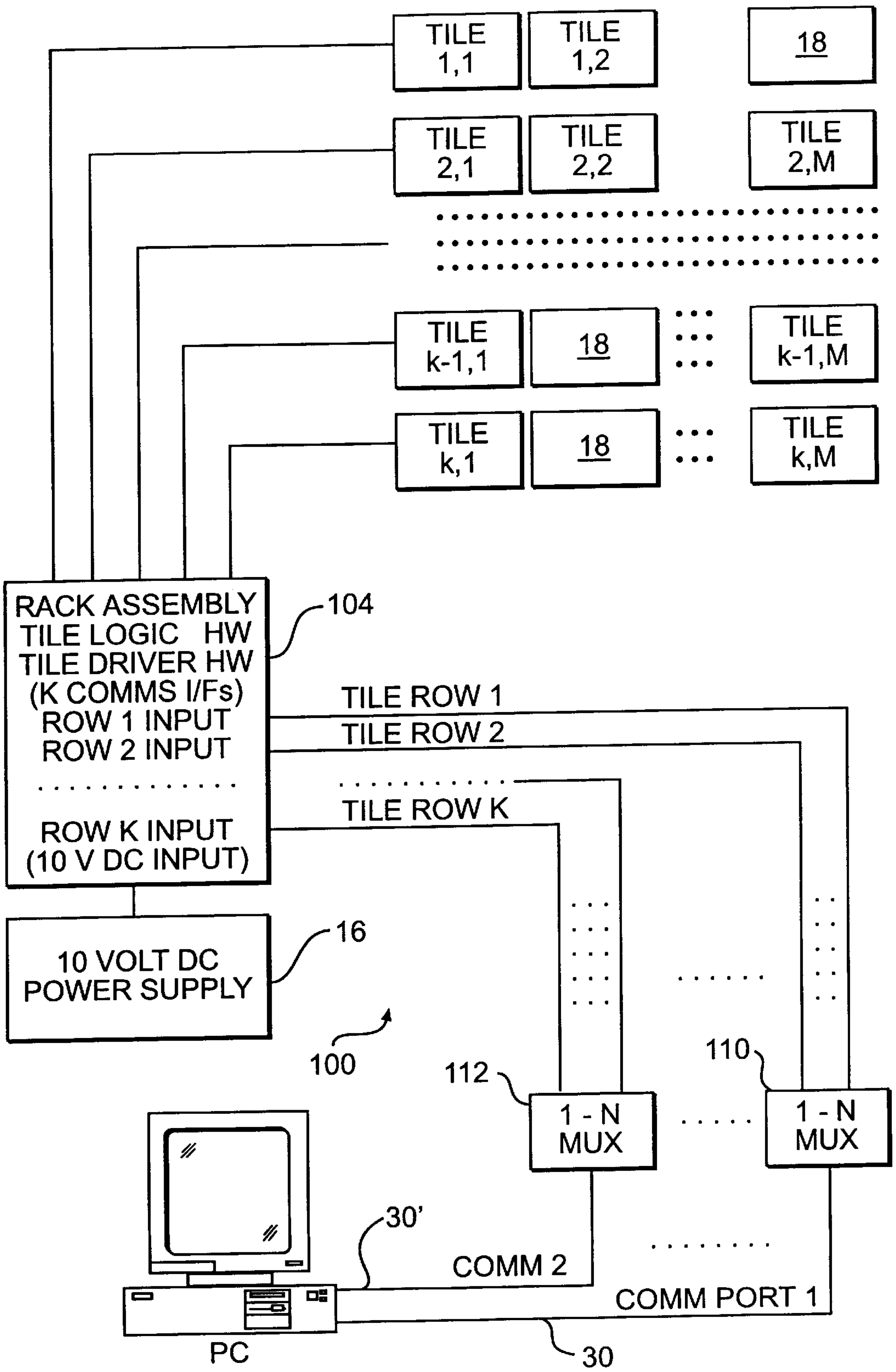
FIG. 5C is a schematic circuit diagram of the display system of the present invention showing a rack assembly for a matrix of picture cells similar to that of the display system of FIG. 4.

Referring to FIGS. 3, 5A and 5B, the rack assembly 14 also has a plurality of 320 bit shift registers 50, one shift register 50 for each picture cell 18. The rack assembly 14 also has a plurality of high current drivers 52, one high current driver 52 for each 320 bit shift register 50. Each of the high current drivers 52 is connected to the pixels 40 of a corresponding one of the picture cells 18. Typically, the high current drivers 52 are capable of producing output current in the range between 10 and 100 milli-amperes—where the pixels 40 are LEDs.

It is envisaged that the pixels 40 could be clusters of LEDs. Alternatively, the pixels 40 could be other light emitting elements provided they have a relatively short delay between on and off states of operation.

It is important to note that the 32 active pixels 40 are located at positions 2, 7, 12, 17, 22, 27, 32, 69, 74, 79, 84, 94, 131, 136, 141, 146, 151, 156, 193, 198, 203, 208, 213, 218, 223, 260, 265, 270, 275, 280 and 285 in the order of operation of the 320 bit shift register 50. That is, the inactive pixels 43 are located between these locations. Hence, the picture cell 18 has only 10% of its maximum possible number of pixels 40.

In the present embodiment the shift register 50 has 320 bits so as to provide the same delay in operation over the active pixels 40 and the inactive pixels 43. This is essential so the human visual system will properly perform the beta effect and interpolate the moving graphic onto the inactive pixels 43. Consequently, there are only 32 pairs of wires connecting each high current driver 52 to each corresponding picture cell 18, instead of 320 pairs of wires. It is envisaged that a single common wire could be connected to each of the active pixels 40 to reduce the number of wires to 33 per picture cell 18.

Hereinafter, the term "pixel" will be used to refer to the 32 active pixels 40 and all 320 pixels 40, 43 will be referred to as the pixels 40 and 43.

In use, a graphic stored in the computer 12 is displayed on the display board 20 by transmission of all of the graphic to the rack assembly 14. Only a portion of the graphic is displayed at any instant in time since there are only 32 active pixels 40 out of a total of 320 pixels. Hence only about 10% of the overall graphic is displayed at any given instant in time. However, the beta effect provides the resolution which would otherwise be lost. An example of the portion is shown in FIG. 1.3.2 for the letters "W" and "g" (although spread over 1 picture cell 18 in the horizontal direction and 5 picture cells 18 in the vertical direction).

The 320 bit shift register 50 corresponding to a given picture cell 18 illuminates the pixels 40 which correspond to the portion of the graphic which is to be shown in the said picture cell 18 at that moment in time. At the next moment in time the graphic is moved forward in the direction of the display board 20 to the next column 42.

The 320 bit shift register 50 is clocked 32 times at high speed to refresh successive columns 42 and 44 of the picture cell 18. The shifting is then halted and the pixels 40 are illuminated for say 10 milli-seconds whilst the shift register 50 remains static. The pixels 40 are then turned off and the clocking is repeated, and thereafter the illumination is repeated and so on. At successive clock cycles the next portion of the graphic is sent to the rack assembly 14. In this way the entire graphic is displayed on the picture cell 18 over successive clock cycles.

Where the display board 20 has more than one picture cell 18 the graphic moves out of the last column 44 of one picture cell 18 and into the next picture cell 18. In the arrangement of FIG. 6B this data is shown to move serially from an input 60 of the picture cell to an output 62 of the picture cell 18. The clock cycles then clock the data along the pixels 40 and 43 to determine which of the pixels 40 to be illuminated.

Alternatively, the pixels 40 and 43 could be driven by 32 10 bit shift registers arranged in parallel. Further, the pixels 40 and 43 could be randomly accessed, such as with a grid reference number from a further computer device.

Figure 4:
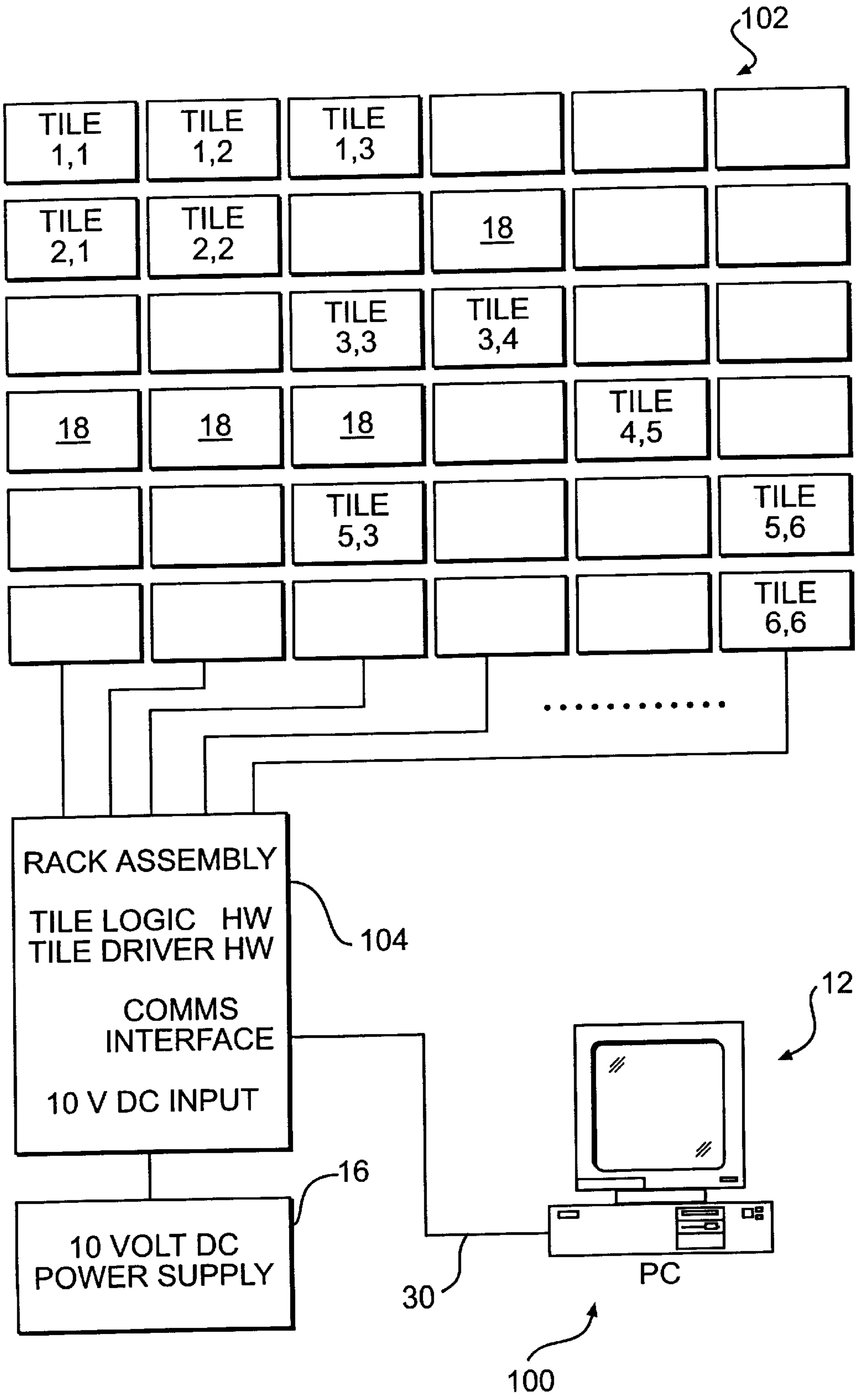
FIG. 4 is a schematic circuit diagram of a display system in accordance with the present invention incorporating a matrix of 6 rows and 6 columns of picture cells.

In FIG. 4 there is shown another display system 100 similar to the display system 10 and like numerals denote like parts. The display system 100 differs from the display system 10 in that the display system 100 has a grid of 36 picture cells 18 arranged in a matrix of 6 rows and 6 columns.

Figure 7:
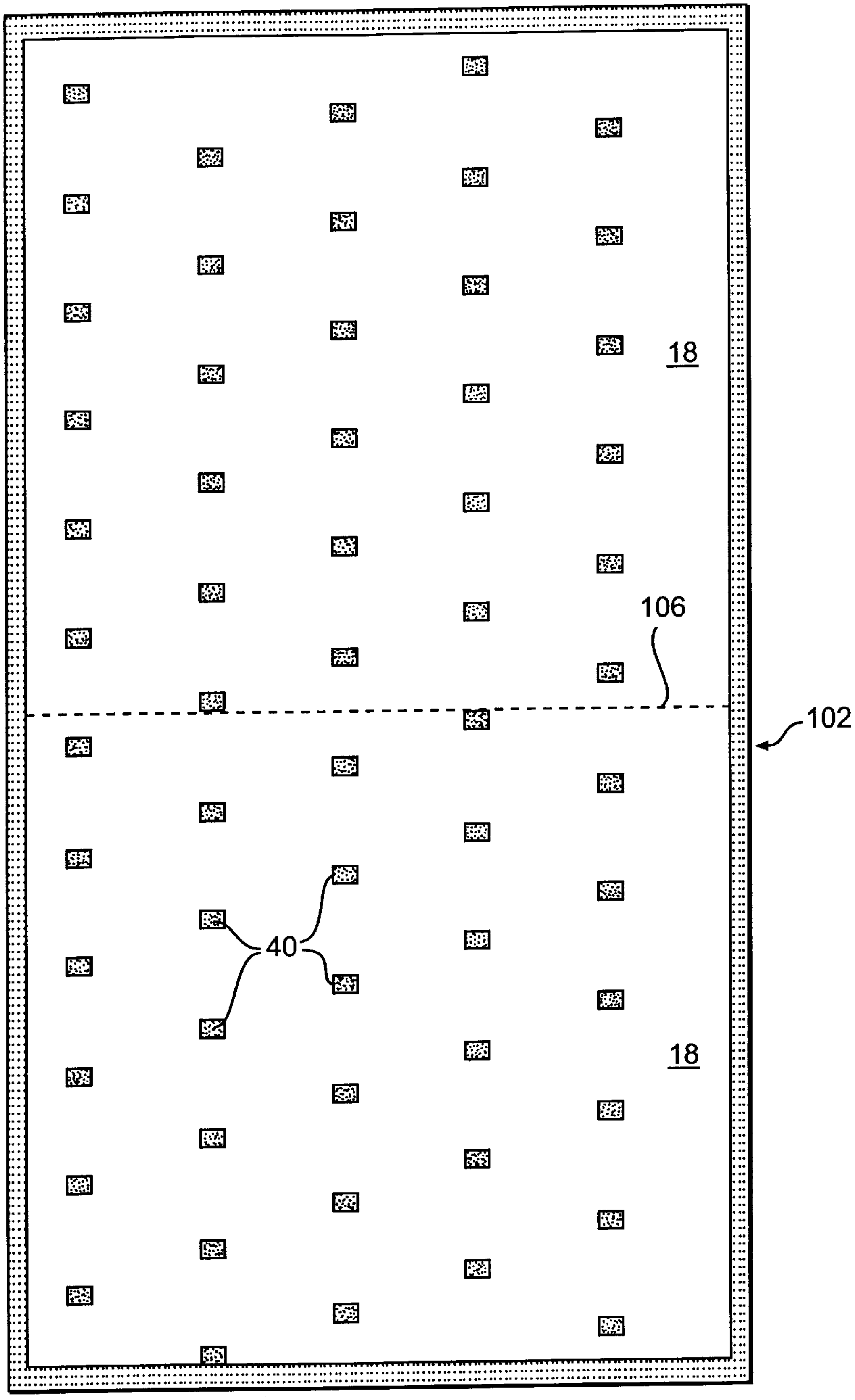
FIG. 7 is a plan view of two picture cells of the display system of the present invention shown mounted one above the other; and, FIG. 8 is a side view of a hand held wand incorporating one of the picture cells of the present invention, for displaying a graphic whilst the wand is moved.

The picture cells 18 differ slightly in that they have 30 pixels 40 instead of 32 pixels 40. This is required so as to allow the picture cells 18 to be arranged in a matrix which has a repeating pattern of pixels 40 as shown in FIG. 7 for a display board 102 having 2 picture cells 18 each with 30 pixels 40. The two picture cells 18 are shown separated by a dashed line 106. If the picture cells 18 has 32 pixels 40 two pixels 40 of one picture cell 18 would overlap with the pixels 40 of the vertically adjacent picture cell 18.

Hence, with the display system 100 it becomes possible to show the graphic moving not only from left to right over the display board 102 but from bottom to top of the display board 102 and vice versa. The computer 12 and the rack assembly 104 are arranged so that the graphic can move in 2 dimensions over the display board 102.

Where there are a relatively large number of columns and rows in the display board 102 it may be necessary to multiplex two comms ports 30 and 30' of the computer 12. In such a case the comms port 30 may be arranged to control half of the rows of the display board 102 and the comms port 30' the other half. In such a case a MUX 110 and 112 is provided for each comms port 30 and 30'.

We have discovered that the display system 10, 100 can be adapted to locate on mullions or window frames of buildings. The pixels 40 of a particular column 42 are mounted on the mullion or window frame and the gap between the adjacent columns 42 is accommodated by the window of the building. The result is that an extremely large sign can be placed on a building without, which is invisible to the occupants of the building, consumes relatively small amounts of power, and is highly visible by people passing the building. In fact the occupants do not even see that there is a graphic (message) being displayed over the space of the window.

The design of such a display board requires that the pixels 40 and 43 be large enough to require a spacing between columns 42 which is equal to the spacing of the mullions or window frames.

The display system 10, 100 will now be described with reference to the following examples.

EXAMPLE 1

The above described display board 20 has the following parameters:

| | | |
|---|---|---|
| height (h) | = | 200 mm |
| length | = | unlimited, but preferably >2000 mm |
| vertical resolution (v) | = | 30 LEDs |
| LED diameter (d) | = | 5 mm |
| brightness of LED | = | 500 mcd |

The vertical spacing (LS) of the LEDs in a full dot matrix (i.e. the vertical spacing of the pixels in the present invention) is then:

LS=h/v=200/30=6.67 mm

We have found that as the size of the display board is scaled up or down it is generally desired to have 30 LEDs vertical resolution per picture cell 18. This produces a scaling factor of:

SF=LED spacing/6.67

EXAMPLE 2

Therefore, we can design the requirements for the spacing of the pixels 40 and 43 in a display board for a building with mullions which are 500 mm apart as follows:

| | | |
|---|---|---|
| Pixel spacing (LS) | = | spacing between mullions/2 columns |
| | = | 500/2 = 250 mm |

That is, there is a column of inactive pixels 43 in the middle of the window and only columns with active pixels 40 are located on the mullions. This corresponds to a full dot matrix display having a column of pixels in the middle of the window.

| | | |
|---|---|---|
| height (H) | = | LS * vertical resolution (v) |
| | = | 250 * 30 = 7,500 mm |

That is a display board 20 with picture cells 18 having a height of 7.5 meters. Assuming that each story of the building is 3 metres high the display board 20, 102 will cover 2.5 stories. Also, the size of the LEDs needed to be resolvable to a viewer over an area of this size is:

| | | |
|---|---|---|
| New LED diam. (D) | = | SF * d (LS/6.67) * d mm |
| | = | (250/6.67) * 5 = 187.4 mm |

EXAMPLE 3

For a picture cell 18 with a height of 7 meters the following parameters apply:

h=7000 mm

LS=h/v=7000/30=233

SF=LS/6.67=233/6.67=34.9

New LED diam. (D)=34.9*5=174.5 mm

A pixel with this diameter is achieved by using a cluster of LEDs which have a combined diameter when mounted of about 175 mm.

Figure 8:
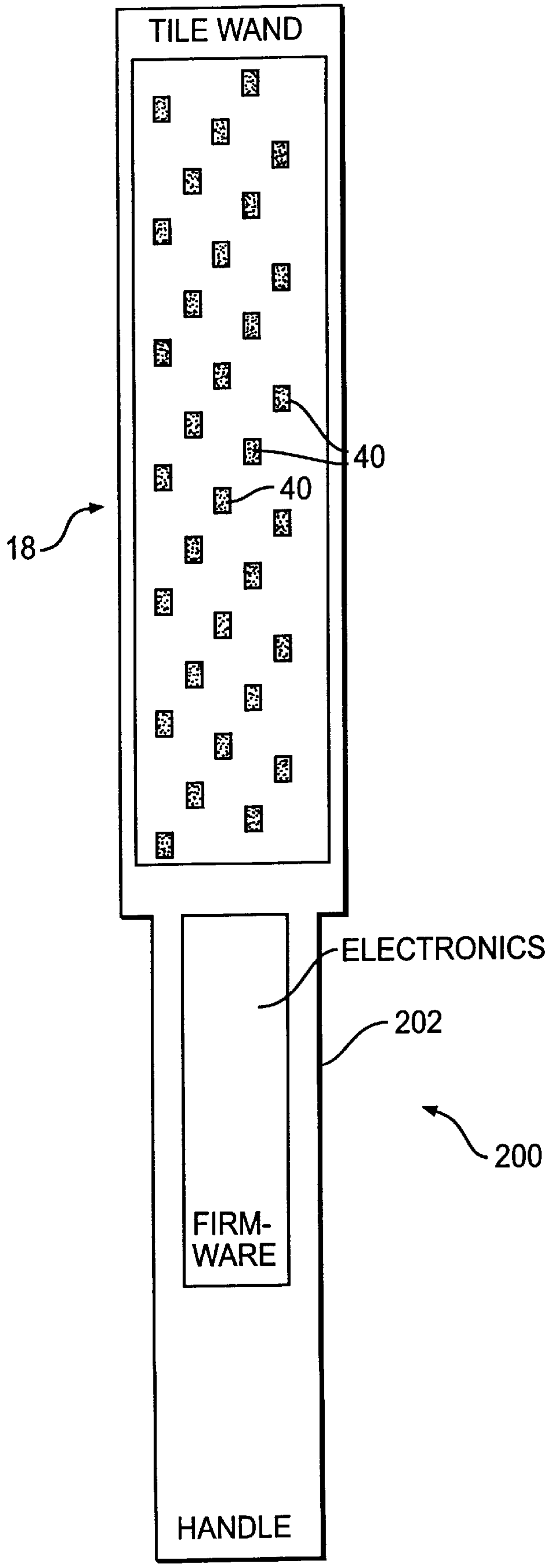

In FIG. 8 there is shown a wand 200 incorporating one of the picture cells 18, but having a vertical resolution of 32 pixels 40 and a horizontal resolution of 5 pixels 40. The wand 200 has a handle 202 which houses a microcomputer (for performing the function of the computer 12) for generating graphics for display by the picture cell 18.

In use, the wand 200 is waved back and forth by a user of the wand 200 (such as a child—using the wand 200 as a toy) to rely upon the beta effect to give an apparent display board which is larger than the area of the picture cell 18.

Alternatively, the wand 200 could be whirled in a circle or moved forward in constant motion to provide a trailing graphic.

The display system 10, 100 of the present invention has the advantage that the picture cell 18 covers a 2 dimensional area which allows a 2 dimensional portion of the graphic to be displayed at any given instant in time. The static resolution of each picture cell 18, in the exemplary embodiment is 6×5=30 pixels 40, whereas the moving display resolution is 6×5×10=300 pixels 40. This is in stark contrast to Patents 493,435 and 573,024 which can only display a line of the graphic at any instant in time. Hence, the display system 10, 100 of the present invention is capable of displaying a static image at a relatively low resolution (about 10% of the original) and a moving image substantially at the same resolution as the original image due to the operation of the beta effect. The resolution of the moving image is much better than that achievable with conventional full matrix displays—again because of the operation of the beta effect.

Also, since the pixels 40 of the picture cell 18 are arranged on separate rows it is possible to show the graphic moving with an upward and/or downward component of motion without risk that the person viewing the display board 20, 102 will lock onto the static components of the graphic and hence loose the beta effect and the apparent resolution. In this regard it is to be understood that the pixels 40 and 43 in the columns 42 and 44 can also be arranged so that each pixel 40 and 43 is in a different column 42 and 44. This can be achieved by having a matrix of 17×17 pixels 40 and 43 in each picture cell. The pixels 40 and 43 are all arranged on diagonals and there are no rows or columns which align the pixels 40 and 43. The resultant picture cells 18 are still stackable vertically and horizontally.

Other size matrices could be used, such as, for example, a matrix of 20×20 pixels 40 and 43. In some cases one or more pixels 40 of adjacent picture cells 18 may overlap and need to be removed from circuit in order to achieve uniform light intensity across the display board 20, 102. The overlap also reduces the reduction in pixels 40 to between 12% and 10%.

Since the display board 20, 102 of the present invention has less pixels 40 it consumes less electrical power, whilst achieving substantially the same resolution (for moving graphics) as a conventional full matrix display. Hence, the display board 20, 102 uses between 10% to 12% of the electrical power of conventional full matrix displays. This represents a considerable saving in operating costs in large displays and in some cases makes the supply of electrical power to the display practicable whereas supply of electrical power to conventional displays tends to become impracticable.

Due to the operation of the beta effect the apparent horizontal resolution is increased such that recognisable graphics can be perceived even when there are only 5 columns of pixels 40. However, where the graphic is intended to undergo similar amounts of motion in both vertical and horizontal directions it is preferred that the picture cells 18 have substantially the same number of pixels 40 and 43 in both vertical and horizontal directions.

The display system 10, 100 of the present invention also has the advantage that it can be viewed at much closer distances than the display systems of Patents 493,435 and 573,024. This is as a result of the distribution of the pixels 40 over the picture cells 18, instead of being concentrated into a single column or two columns with interlacing.

Modifications and variations such as would be apparent to a skill addressee are considered within the scope of the present invention. For example, other arrangements of pixels 40 and 43 could be used.

We claim:

1. A display system for depicting a moving graphic at high resolution and a static graphic at low resolution, the display system showing portions of the graphic distributed over it and the distribution being such that the graphic is interpretable as the complete graphic, the display system comprising:

a display means having at least one picture cell, the at least one picture cell having a plurality of pixels including active pixels which can be illuminated and inactive pixels which can not be illuminated, the inactive pixels being located between the active pixels such that the active pixels are substantially uniformly distributed over the picture cell for showing the graphic at a uniform intensity for both moving graphics and static graphics and so that the display means can be viewed at much closer distances than would otherwise be possible, the active pixels being able to be illuminated so as to depict the portions of the graphic distributed over the picture cell; and, a controller means for generating a first set of electrical signals representing each successive portion of the graphic for displaying successive portions of the graphic distributed over the entire picture cell at each instant in time, and for generating a second set of electrical signals for causing the portions of the graphic to be displayed upon the picture cell, the first set of electrical signals being able to cause the active pixels to be illuminated in correspondence with the portions of the graphic and the second set of electrical signals being able to cause the successive portions of the graphic to be displayed upon the picture cell such that by the visual accumulation of successive ones of the second set of electrical signals a person viewing the picture cell the entire graphic is displayed over the active pixels over a period of time, and such that the display means can display moving graphics at high resolution and static graphics at low resolution whilst being interpretable as the entire graphic.

2. A display system according to claim 1, in which the at least one picture cell has a plurality of columns each with more than one active pixel in it, and in which the picture cell has a plurality of rows each with only one active pixel in it so that no component of the graphic is repeated when moving horizontally over the picture cell so that the graphic has a uniform intensity over the picture cell and so that the graphic can have both horizontal and vertical components of motion.

3. A display system according to claim 1, in which the at least one picture cell has a plurality of columns each with only one active pixel, and in which the picture cell has a plurality of rows each with only one active pixel in it so that no component of the graphic is repeated when moving about the picture cell in any direction.

4. A display system according to claim 1, in which the at least one picture cell has the active pixels arranged in diagonal lines which intersect in a grid type manner so that each successive portion of the graphic is inhibited from having the appearance of breaking up when viewed moving in any direction.

5. A display system according to claim 1, in which the display means has a plurality of the picture cells located one adjacent the other in a single row and the controller means being able to control the passage of the portions of the graphic over the plurality of picture cells so as to depict over a period of time the entire graphic at a high resolution.

6. A display system according to claim 5, in which the location of the pixels in one of the picture cells is the same as the location of the pixels in its adjacent picture cells, and the location of the pixels in each picture cell is such that the active pixels in one picture cell match with the location of the pixels in the next picture cell so that there is no apparent change in the pattern formed by the location of the active pixels in the picture cells.

7. A display system according to claim 1, in which the display means has a plurality of the picture cells located in an array of rows and columns and the controller means being able to control the passage of the portions of the graphic over the plurality of picture cells so as to depict over a period of time the entire graphic at a high resolution.

8. A display system according to claim 7, in which the location of the pixels in one of the picture cells is the same as the location of the pixels in its adjacent picture cells in the array of picture cells, and the location of the pixels in each picture cell is such that the active pixels in one picture cell match with the location of the pixels in the next picture cell so that there is no apparent change in the pattern formed by the location of the active pixels in the array picture cells.

9. A display system according to claim 1, in which the controller means has a serial shift register with one shift element per pixel of the picture cell so that the moving graphic can be depicted on the picture cell over the active pixels.

10. A display system according to claim 1, in which the controller means has a plurality of serial shift registers with one shift register per row of the picture cell and each shift register having one shift element per column so that successive portions of the moving graphic can be depicted on the picture cell over the active pixels at each successive instant in time.

11. A display system according to claim 1, in which the controller means has a random access memory device having one memory element per pixel so that the active pixels can be accessed randomly to depict successive portions of the graphic at each successive instant in time.

12. A display system according to claim 1, in which the picture cell is mounted upon a member for being held by the hand of an operator, the member having the pixels distributed substantially uniformly over it for depicting the portions of the graphic.

13. A display system according to claim 12, in which the member can be moved through the air to provide a latent image of the portions of the graphic in the air such that over a period of time the entire graphic can be interpreted by a person viewing the moving member.

14. A method of depicting a moving graphic at high resolution and a static graphic at low resolution on a display means having at least one picture cell, the at least one picture cell having a plurality of pixels including active pixels which can be illuminated and inactive pixels which can not be illuminated, the inactive pixels being located between the active pixels such that the active pixels are substantially uniformly distributed over the picture cell for showing the graphic at a uniform intensity for both moving graphics and static graphics and so that the display means can be viewed at much closer distances than would otherwise be possible, the active pixels being able to be illuminated so as to depict the graphic, and a controller means for generating a first set of electrical signals representing each successive portion of the graphic for displaying successive portion of the graphic distributed over the entire picture cell at each instant in time, and for generating a second set of electrical signals for causing the portions of the graphic to be displayed upon the picture cell, the first set of electrical signals being able to cause the active pixels to be illuminated in correspondence with the portions of the graphic and the second set of electrical signals being able to cause the successive portions of the graphic to be displayed upon the picture cell such that by the visual accumulation of successive ones of the second set of electrical signals by a person viewing the picture cell the entire graphic is displayed over the active pixels over a period of time, the method comprising the steps of generating the first set of electrical signals corresponding to the entire graphic, generating the second set of electrical signals and applying the second set of electrical signals to the display means for causing successive portions of the graphic to be displayed upon the at least one picture cell so that the display means can display moving graphics at high resolution and static graphics at low resolution whilst being interpretable as the entire graphic.

* * * * *